US009740750B1

(12) United States Patent
van Dijk

(10) Patent No.: US 9,740,750 B1
(45) Date of Patent: *Aug. 22, 2017

(54) SELECTING SCORE IMPROVEMENTS

(71) Applicant: Google Inc., Mountain View, CA (US)

(72) Inventor: Luuk van Dijk, Zurich (CH)

(73) Assignee: Google Inc., Mountain View, CA (US)

( * ) Notice: Subject to any disclaimer, the term of this patent is extended or adjusted under 35 U.S.C. 154(b) by 71 days.

This patent is subject to a terminal disclaimer.

(21) Appl. No.: 14/856,959

(22) Filed: Sep. 17, 2015

Related U.S. Application Data

(63) Continuation of application No. 13/632,759, filed on Oct. 1, 2012, now Pat. No. 9,152,714.

(51) Int. Cl.
*G06F 7/00* (2006.01)
*G06F 17/30* (2006.01)

(52) U.S. Cl.
CPC .... *G06F 17/3053* (2013.01); *G06F 17/30528* (2013.01); *G06F 17/30867* (2013.01)

(58) Field of Classification Search
CPC .......... G06F 17/3061; G06F 17/30663; G06F 17/30699; G06F 17/30702; G06F 17/30867; G06F 17/30
USPC ........ 707/3, 6, 687, 4, 5, 749, 755, 999.003, 707/999.006, 999.004, 999.005
See application file for complete search history.

(56) References Cited

U.S. PATENT DOCUMENTS

| | | | |
|---|---|---|---|
| 6,728,704 B2 | 4/2004 | Mao et al. | |
| 7,577,655 B2 | 8/2009 | Curtiss et al. | |
| 7,716,223 B2 | 5/2010 | Haveliwala et al. | |
| 8,090,621 B1 | 1/2012 | Chakrabarti et al. | |
| 8,244,722 B1 | 8/2012 | Koningstein | |
| 8,442,984 B1 | 5/2013 | Pennock et al. | |
| 8,452,780 B2 | 5/2013 | Graham et al. | |
| 8,583,633 B2 | 11/2013 | Sundaresan | |
| 2002/0078045 A1 | 6/2002 | Dutta | |
| 2002/0138481 A1 | 9/2002 | Aggarwal et al. | |
| 2006/0143159 A1 | 6/2006 | Chowdhury et al. | |
| 2007/0156663 A1 | 7/2007 | Slackman | |
| 2008/0065600 A1 | 3/2008 | Batteram et al. | |
| 2009/0112818 A1 | 4/2009 | Jose et al. | |
| 2009/0157644 A1 | 6/2009 | Gollapudi et al. | |

(Continued)

FOREIGN PATENT DOCUMENTS

WO 2009/009428 1/2009

*Primary Examiner* — James Trujillo
*Assistant Examiner* — John J Morris
(74) *Attorney, Agent, or Firm* — Fish & Richardson P.C.

(57) ABSTRACT

Methods, systems, and apparatus, including computer programs encoded on a computer storage medium, for selecting score improvements. In one aspect, a method includes obtaining search query data, each search query being associated user selection data that identifies which search results were selected by users; obtaining a plurality of score improvement lists, each score improvement list being an ordered list of adjusters, wherein the adjusters are serially applied to initial scores of a group of search results to determine a final scoring of the search results; testing the plurality of score improvement lists comprising: iteratively selecting pairs of score improvement lists from a pool of score improvement lists, and determining, for each pair of score improvement lists, a winning score improvement list and a losing score improvement list based on the search query data, repeating testing until ending criteria are reached; and selecting one or more score improvement lists.

20 Claims, 6 Drawing Sheets

(56) References Cited

U.S. PATENT DOCUMENTS

2011/0296463 A1 12/2011 Suslov
2012/0102002 A1 4/2012 Sathyanarayana et al.

SELECTING SCORE IMPROVEMENTS

CROSS-REFERENCE TO RELATED APPLICATIONS

This application is a continuation application of, and claims priority to, U.S. patent application Ser. No. 13/632,759, for Selecting Score Improvements, filed on Oct. 1, 2012 now U.S. Pat. No. 9,152,714. The disclosure of the foregoing application is incorporated here by reference.

BACKGROUND

This specification relates to selecting score improvements.

Internet search engines aim to identify resources, e.g., web pages, images, text documents, multimedia content, that are relevant to a user's needs and to present information about the resources in a manner that is intended to be useful to the user. Internet search engines return a set of search results that identify particular resources in response to a user submitted query. Internet search engines can also order the set of search results based on relevance to the user submitted query.

SUMMARY

This specification describes technologies relating to selecting score improvements.

The system described can select one or more particular orders of score improvements by "reproducing" lists of score improvements with each other. A score improvement list is an ordered list of adjusters that, when applied to a set of search results from a search engine, can reorder the set of search results. For example, a search system can use a group of score improvement lists to refine initial scores assigned to a given group of search results. That is, the search results can be ranked according to the initial scores and reordered based on the refinements to the initial scores.

The reordered set of search results can be more relevant than the original set of search results. The system can select pairs of score improvement lists from a pool of score improvement lists. For each pair, the system tests the pair to determine a winning score improvement list and a losing score improvement list. The system then breeds score improvement lists, based on a number of wins and losses, to create children score improvement lists. By repeatedly testing and breeding score improvement lists, the system can select one or more score improvement lists to apply when determining an order of search results responsive to a given search query.

In general, one innovative aspect of the subject matter described in this specification can be embodied in methods that include the actions of obtaining search query data, the search query data including a plurality of search queries submitted by users, each search query being associated with one or more responsive search results and user selection data for the one or more search results, wherein the user selection data identifies which search results were selected by users; obtaining a plurality of score improvement lists, each score improvement list having a point value, each score improvement list being an ordered list of adjusters, wherein the adjusters are serially applied to initial scores of a group of search results to determine a final scoring of the search results; testing the plurality of score improvement lists comprising: iteratively selecting pairs of score improvement lists from a pool of score improvement lists, the pool of score improvement lists including the plurality of score improvement lists, and determining, for each pair of score improvement lists, a winning score improvement list and a losing score improvement list based on the search query data, wherein the point value of the winning score improvement list is increased and the point value of the losing score improvement list is decreased; repeating testing until ending criteria are reached; and selecting one or more score improvement lists based on the respective point values.

Implementations may include one or more of the following. In response to the determining, breeding score improvement lists having high point values with each other using genetic operators to create children score improvement lists; and adding the children score improvement lists to the pool of score improvement lists. In response to breeding the score improvement lists having a high point value, breeding the score improvement lists having a low point value with score improvement lists having a high point value using a mutation to create additional children score improvement lists, wherein the mutation has a probability of shuffling an order of one or more adjusters in the score improvement lists having a low point value. Having high point values comprises including one or more of the following: reaching a threshold value or being in a top percentile of the point values in the pool of score improvement lists. The ending criteria include one or more of the following: the point values in the pool of score improvement lists stabilize, a number of iterations has run, the number of iterations reaches an iteration threshold, or a point value in the pool of score improvement lists reaches a threshold amount more than the other point values. The determining further comprises: selecting a search query from the search query data; identifying a first order of search results, the first order created by applying a first score improvement list in the pair of score improvement lists to search results responsive to the search query; identifying a second order of search results, the second order created by applying a second score improvement list in the pair of score improvement lists to the search results; selecting a user preferred search result in the search results based on the user selection data associated with the search results; determining the user preferred search result in the first order has a higher score than a score of the user preferred search result in the second order; and assigning the first score improvement list as the winning score improvement list and the second score improvement list as the losing score improvement list. The user preferred search result is based on one or more of the following: a number of times the search result has been selected by users, or an amount of user time spent at a particular resource associated with the search result. The genetic operators include one or more of crossover and mutation. Selecting pairs of score improvement lists from the pool of score improvement lists is based on one or more of the following: randomly or requiring each score improvement list being tested against every other score improvement list in the pool. The user selection data includes, for each search result, a length of user time spent at a particular resource associated with the search result.

Particular embodiments of the subject matter described in this specification can be implemented so as to realize one or more of the following advantages. Given a number of score improvement lists, the system can identify one or more score improvement lists that provide highly relevant search results in response to a search query.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
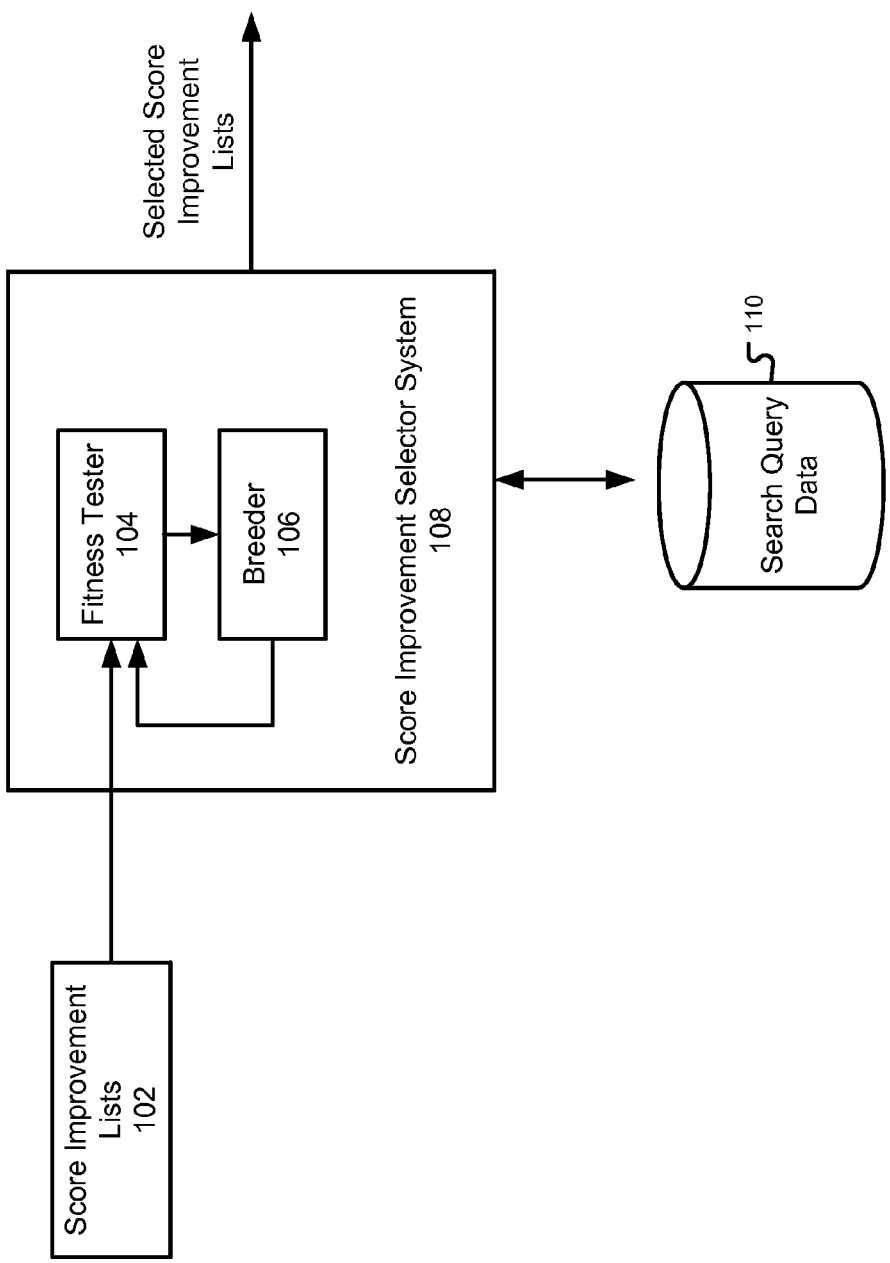
FIG. 1 is a schematic illustration of an example architecture that includes a score improvement selector system.

FIG. 1 is a schematic illustration of an example architecture 100 that includes a score improvement selector system 108. The system 108 can be implemented on one or more computers located in one or more locations. The system 108 includes a fitness tester 104 and a breeder 106. The system 108 receives score improvement lists 102. A score improvement list can be an ordered list of adjusters that, when applied to a set of search results from a search engine, adjusts scores that are used to rank the search results. As a result, the adjustment can result in reordering of some or all of the results. Score improvement lists 102 will be described below in reference to FIG. 2.

The fitness tester 104 receives the score improvement lists 102 and tests score improvement lists against each other, e.g., using a fitness function. The fitness tester 104 determines a winning score improvement list and a losing score improvement list based on search query data 110. Search query data 110 can include a search history from a collection of users, for example, as derived from a search query log. A search query log can be processed, for example to filter or aggregate data in the log to provide search query data. The search query data can include search queries submitted by the collection of users as well as search results responsive to the respective search queries and user selection data. Testing, or "battling," score improvement lists with each other is described below in reference to FIG. 5. The breeder 106 receives score improvement lists from the fitness tester 104, breeds the score improvement lists, and sends the results of the breeding to the fitness tester 104. Breeding is discussed below in reference to FIGS. 3 and 6. The system 108 can provide selected score improvement lists to a search engine.

Figure 2:
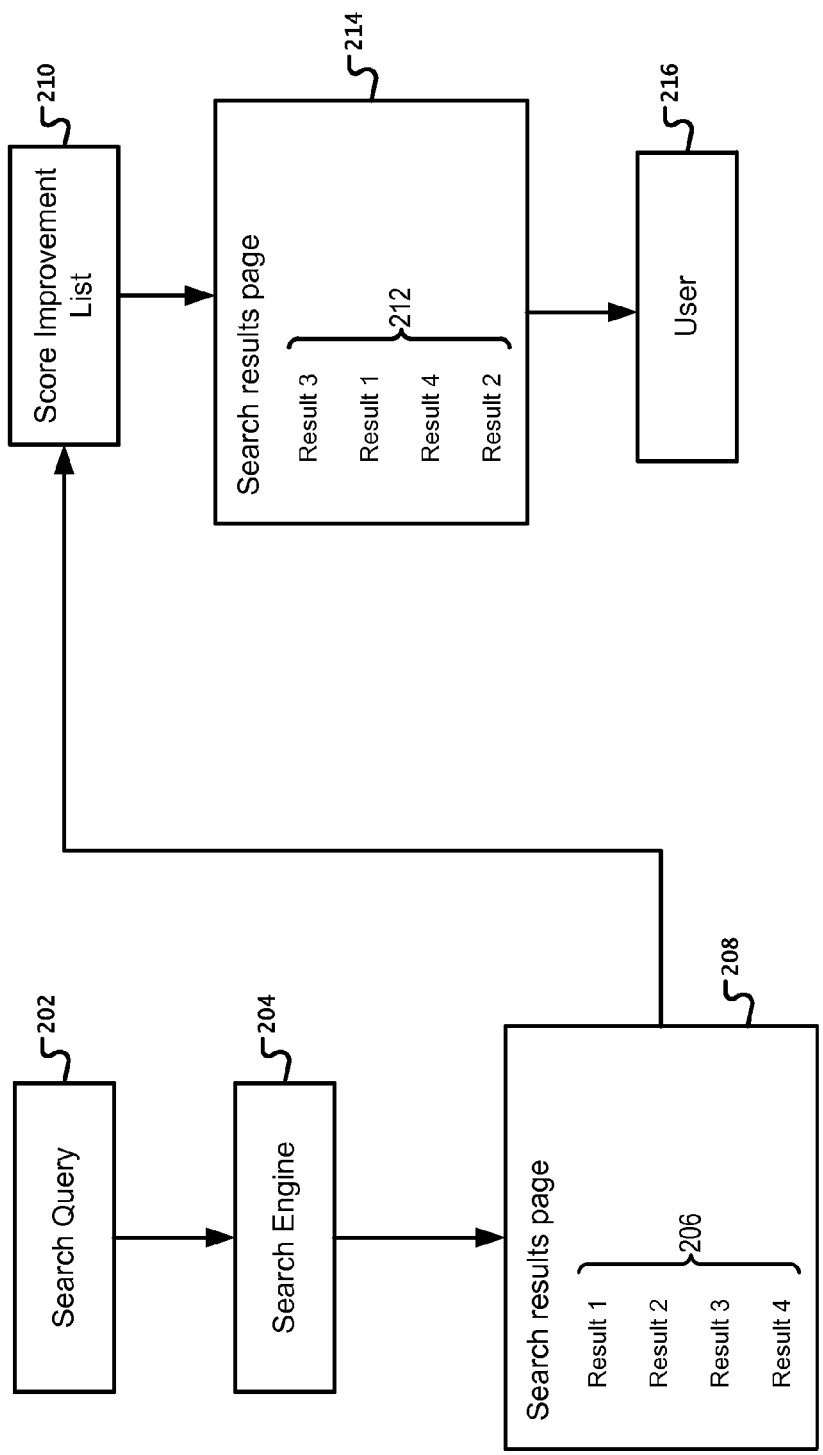
FIG. 2 is a diagram illustrating an application of score improvement lists to search results.

FIG. 2 is a diagram 200 illustrating application of score improvement lists to search results.

To obtain search results, a user 216 can enter a search query 202 into a search engine 204. The search engine 204 processes the search query 202 and determines search results 206 responsive to the search query 202. The search results 206 can be ordered by relevance based on the search query 202 by using a scoring function. The search results, if presented to the user 216, can be represented as a page of ordered search results 208, e.g., Result 1, Result 2, Result 3, and Result 4.

Before presenting the search results 206 to the user 216, the search engine 204 can optionally apply a score improvement list 210 to the ordered search results 206. A score improvement list can be an ordered list of adjusters. Each adjuster, when applied, modifies a score for each search result. The modified scores, after each adjuster has been applied, can result in a reordering of the search results. For example, a particular adjuster can increase scores for search results that include location if the associated search query includes a location, for example, by applying a particular multiplier to the score or a portion of a scoring function. Thus, by applying the adjusters of the score improvement list 210, the search results 206 originally ordered Result 1, Result 2, Result 3, and Result 4 are be reordered into search results 212 having an order Result 3, Result 1, Result 4, and Result 2. A page with the reordered results 214 can then be provided to the user 216 for display, e.g., in a browser interface on a user device.

After the search engine provides the search results 206 to a user 216, e.g., for presentation on a user device, user selection data of the search results can be stored as search query data, which will be described below in reference to FIG. 3.

Figure 3:
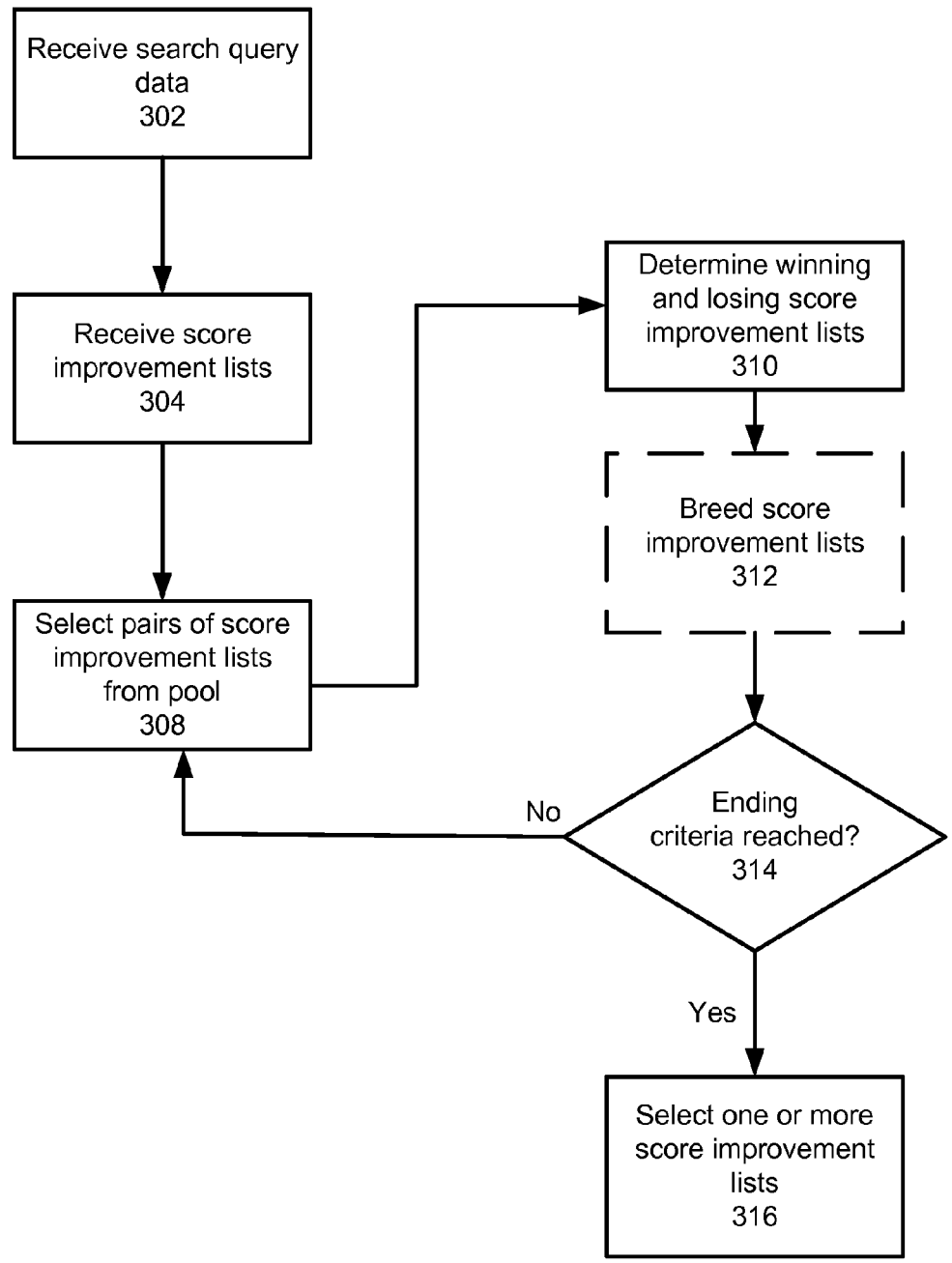
FIG. 3 is a flow chart illustrating an example method for selecting score improvement lists.

FIG. 3 is a flow chart illustrating an example method 300 for selecting score improvement lists. For convenience, the method 300 will be described with respect to a system, e.g., the score improvement selector system described in reference to FIG. 1, having one or more computing devices that perform the method 300.

The system obtains search query data 302. The system can obtain the search query data based on one or more databases of search query logs. The search query data can include data associated with search queries including user submitted search queries, search results responsive to the search queries, and user selection data of the search results. The user selection data can include, for each set of search results responsive to a search query, which search results were selected by users. The user selection data can also include a length of time spent, by the user, at a particular resource, e.g., a web page, associated with the search result. In some implementations, the system anonymizes the user selection data.

The system can obtain score improvement lists 304. The system can obtain score improvement lists from one or more databases of score improvement lists, e.g., associated with a search engine. In some implementations, each obtained score improvement list includes the same set of adjusters, but the adjusters are ordered differently. In alternative implementations, some obtained score improvement lists include unique sets of adjusters that are not included in other obtained score improvement lists. Each obtained score improvement list can be associated with a point value. In some implementations, point values have an initial value of 0. The obtained score improvement lists are added to a pool of score of improvement lists. The system selects pairs of score improvement lists from the pool of score improvement lists 308. Initially, the pool of score improvement lists includes the received score improvement lists. After testing and breeding, the pool can include the initial obtained score improvement lists and "child" score improvement lists derived from the obtained "parent" score improvement lists. Parent and child score improvement lists will be described below in reference to FIG. 4. A given selected pair of score improvement lists can include two parent score improvement lists, two child score improvement lists, or one of each.

For each pair of score improvement lists, the system determines a winning score improvement list and a losing score improvement list 310. The system determines this by testing the score improvement lists based on one or more entries in the search query data. The system also adjusts point values associated with the score improvement lists based on the test results. For example, a point value of a winning score improvement list can be incremented. This is described further below in reference to FIG. 5.

The system optionally breeds additional score improvement lists 312. In some implementations, the system uses genetic operators for breeding. Examples of breeding, e.g., crossover and mutation, are described below in reference to FIG. 6.

The system can breed pairs of score improvement lists that have high point values to create multiple "child", also referred to as "children", score improvement lists. In some implementations, point values are high if the point values are in a top percentile, e.g., top 1%, 3%, 5%, or 10%, of point values in the pool of score improvement lists. In some other implementations, point values are high if the point values reach a threshold value, e.g., the point values have a value of at least 100. The system can add the children score improvement lists to the pool of score improvement lists.

The system can breed a score improvement list that has a high point value with a score improvement list that has a medium or low point value. Low and medium point values can be, respectively, in the bottom, e.g., bottom 1%, 5%, or 10%, and medium percentile, e.g., between 40% and 60%, of point values in the pool of score improvement lists. In some implementations, the system uses mutation to breed this pairing type.

The system can repeatedly test and breed score improvement lists, thereby increasing the pool of score improvement lists, until one or more specified ending criteria are reached 314. In some implementations, ending criteria include having stabilized point values for some score improvement lists in the pool of score improvement lists. For example, if point values for the score improvement lists with high point values are changing, e.g., after repeated point value adjustments during testing, but ultimately remain within a range of point values over time, e.g., having point values with a plus or minus 10% delta, the point values can be in a stabilized state. In some implementations, ending criteria include having iterated through the testing and breeding process for a threshold number of times, e.g., 100, 1,000, 10,000, 100,000, 1,000,000 times. In some implementations, ending criteria include a score improvement list having a high point value that reaches a threshold number of points more than other point values in the pool of score improvement lists. In some other implementations, ending criteria include having a score improvement list reach a threshold point value, e.g., the first score improvement list to reach a point value of 100 stops the process.

The system selects one or more score improvement lists 316. In some implementations, the system selects score improvement lists during the testing and breeding. In some other implementations, the system selects score improvement lists after ending criteria are reached. The system can select score improvement lists based on their respective point values. For example, the system can select score improvement lists having a top percentile of point values. The system can also select score improvement lists that have point values over a threshold.

Figure 4:
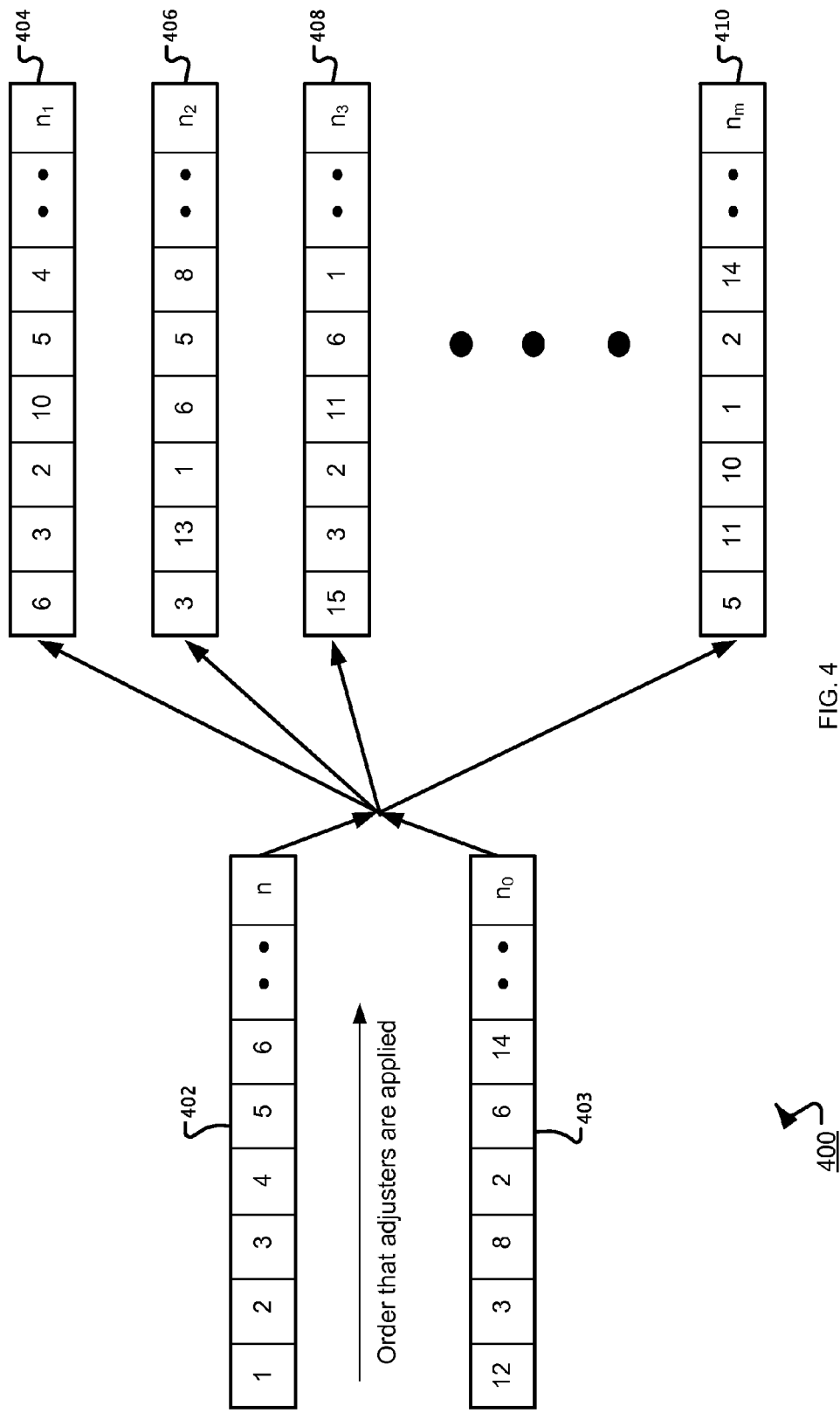
FIG. 4 is a diagram illustrating example parent and children score improvement lists.

FIG. 4 is a diagram 400 illustrating example parent and children score improvement lists. A parent score improvement list has n elements 402. Another parent score improvement list has no elements 403. Each element in the score improvement lists represents an adjuster. The adjusters are applied from left to right, e.g., for parent score improvement list 402, adjuster '1' is applied first, adjuster '2' is applied second, etc. The parent score improvement lists 402, 403 can breed, as will be described further in reference to FIG. 6. After breeding, the parent score improvement list can have multiple children score improvement lists 404, 406, 408, and 410. The order of the adjusters for each improvement list can be different. For example, the child improvement list 404 first applies adjuster '6', then adjuster '3', then adjuster '2', etc. The order in child improvement list 404 is different from both parent score improvement lists 402, 403 and other children improvement lists 406, 408, 410.

Figure 5:
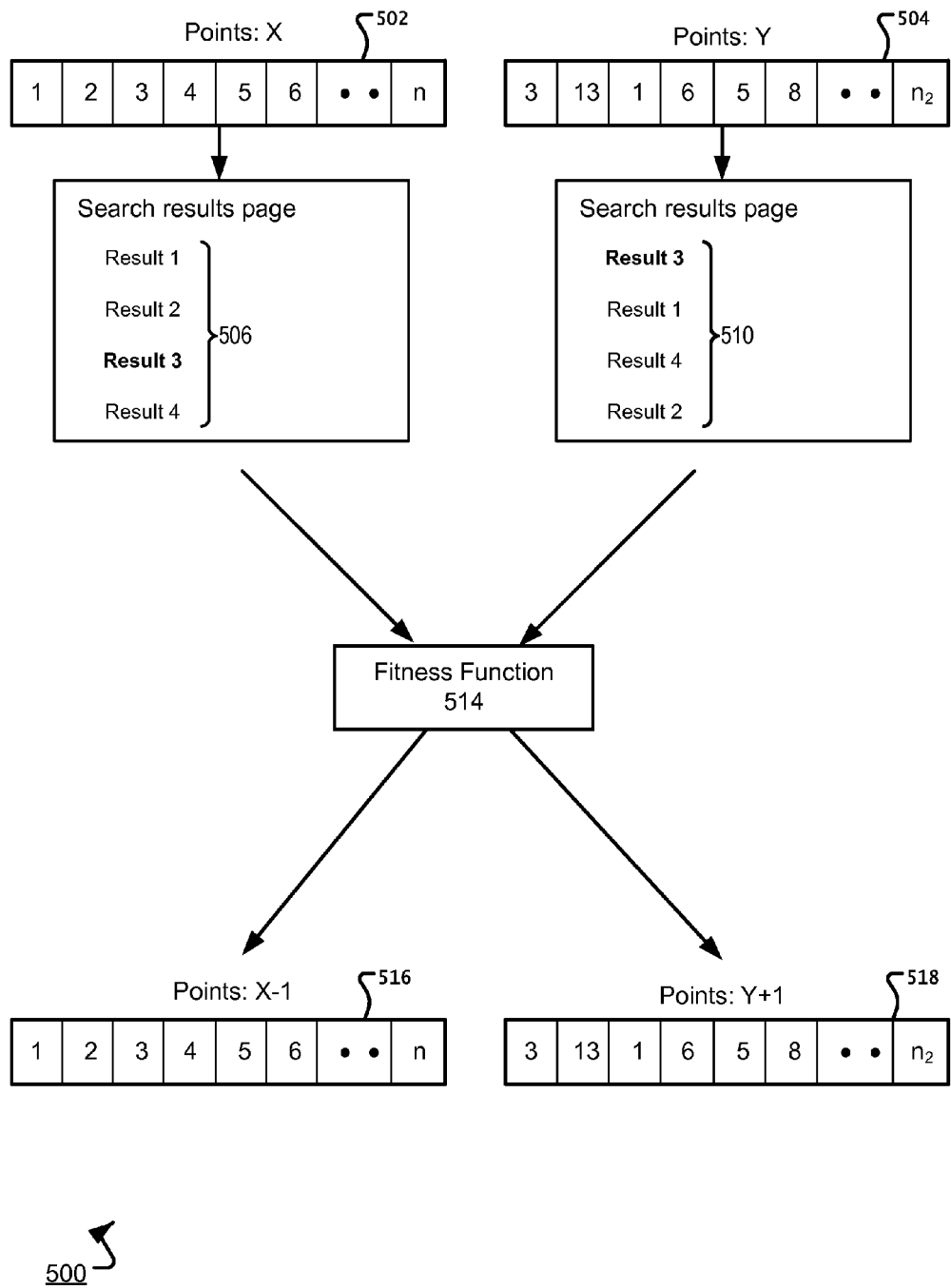
FIG. 5 is a diagram illustrating an example test between score improvement lists.

FIG. 5 is a diagram 500 illustrating example testing between score improvement lists. Given a pair of score improvement lists, a system, e.g., a fitness tester in described in FIG. 1, selects a winning score improvement list and a losing score improvement list.

The system selects a search query from search query data. In some implementations, the search query is selected randomly or pseudo-randomly. In some alternative implementations, the search query is selected based on particular criteria. The criteria can include search query traffic, e.g., a number of times users submit the query to a search engine. For example, the system can select a search query having high search query traffic. The system can receive data from the search query data associated with the search query. The data can include search results responsive to the search query and user selection data associated with the search query as described above in reference to FIG. 1.

The system identifies two orders of search results corresponding to the pair of score improvement lists from the search query data. The system, which can include a search engine, orders search results responsive to the search query by ranking the search results by score. The search engine applies a first score improvement list 502 to adjust scores for the search results into a first order 506, as described above in reference to FIG. 2. The search engine also applies a second score improvement list 504 to adjust the scoring of the search results into a second order 510. The system obtains user selection data from the search query data and analyzes the user selection data corresponding to the two orders with a fitness function 514.

The fitness function 514 selects a user preferred search result based on the user selection data. In some implementations, the user preferred search result is a search result in a set of search results that is selected by a majority of users. For example, if, in the first order, second order, or both orders, Result 3 is selected by a majority of users compared to Results 1, 2, and 4, the system can select Result 3 as the user preferred search result. In some other implementations, the user preferred search result is a search result in the set of search results which links to a resource that users spend the most time on. For example, if, in the first order, second order, or both orders, users spend a significant amount of dwell time in the resource linking to Result 3 compared to resources linked to Results 1, 2, and 4, the system can select Result 3 as the user preferred search result. In alternative implementations, the user preferred search result is selected based on both of the above. Furthermore, while the present specification refers to user selected search results, in some alternative implementations the process can use search results that are not selected by the user as an indicator of user preferred search results. In particular, the fitness function can use the search results that are not selected by the user and their respective position in the order in determining the user preferred search result, for example, if search results presented to the user at a higher position in the order are not selected by the user in favor of another search result lower in the order.

After selecting the user preferred search result, the system applies the fitness function 514 to the two orders of search results. The fitness function 514 compares the ranking of the user preferred search result in both orders with each other. In some implementations, the fitness function 514 determines the score improvement list having a user preferred search result with a higher ranking to be the winner score improvement list. As a result, the other score improvement list is the losing score improvement list.

For example, if a threshold number of users selected Result 3 when entering the selected search query, the system can select Result 3 as the user preferred search result, illustrated in FIG. 5 in bold. The first order 506 has an order of Result 1, Result 2, Result 3, and Result 4. The second order 510 has an order of Result 3, Result 1, Result 4, and Result 2. Result 3 is ranked higher in the second order 510, e.g., rank 1, compared to the rank in the first order 506, e.g., rank 3. In this case, the second score improvement list 504 would be the winner and the first score improvement list 502 would be the loser.

The fitness function 514 can adjust the point values associated with the score improvement lists. The point value for the winning score improvement list 518 can be increased and the point value for the losing score improvement list 516 can be decreased. In some implementations, the winner's point value increases by 1 and the loser's point value decreases by 1. In some other implementations, the winner's point value increases by 1 and the loser's point value remains unchanged. In alternative implementations, the point value is adjusted based on the difference in scores between the user preferred search results in the two orders. For example, if the user preferred search result is ranked first in a first order, and the user preferred search result is ranked last in a second order, the point value for the score improvement list of the first order can be increased by a weighted amount, e.g., increase by 10, and the point value for the score improvement list of the second order can be decreased by another weighted amount, e.g., decrease by 5. Other weighted increases and decreases are possible.

Figure 6:
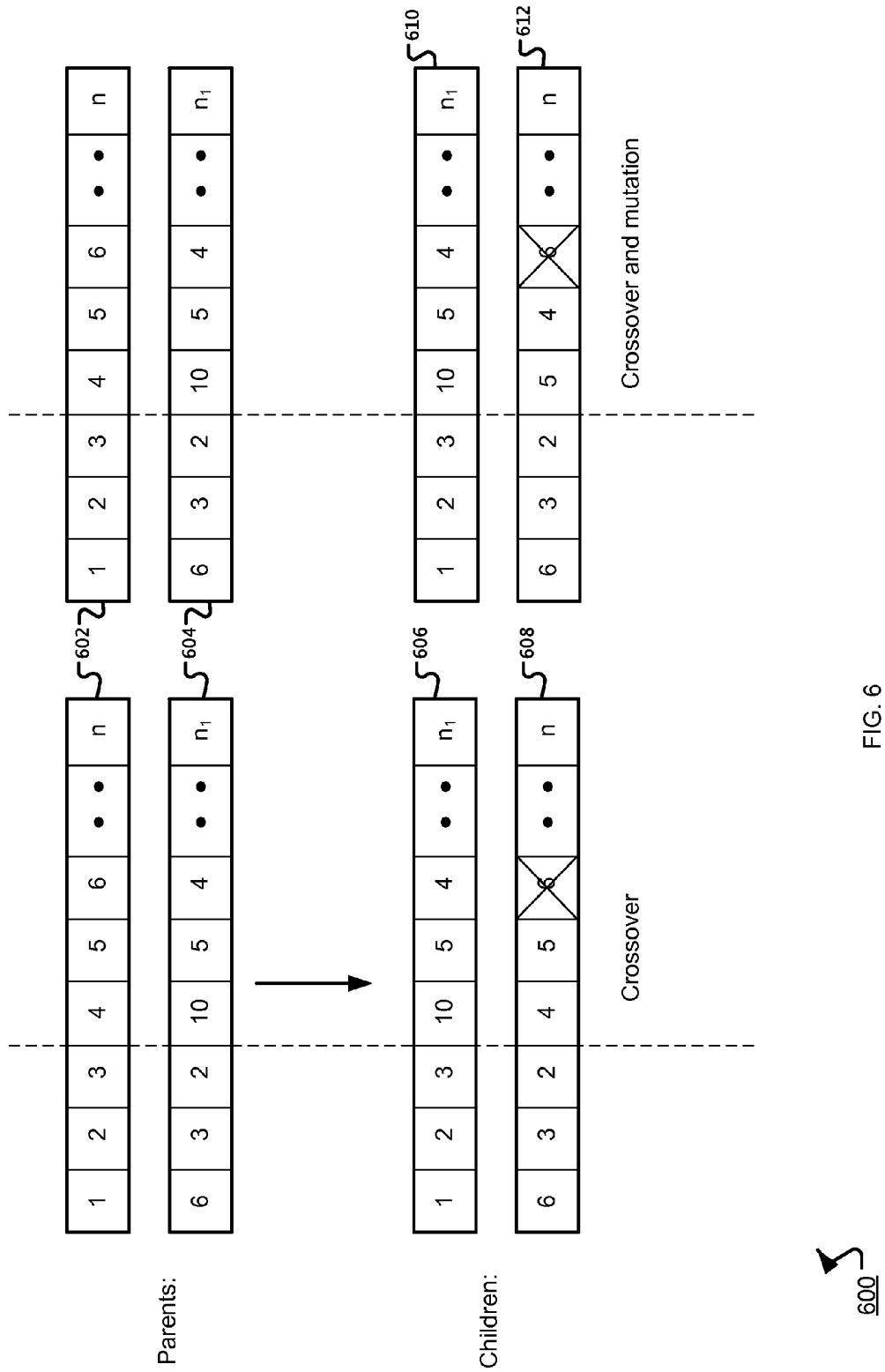
FIG. 6 is a diagram illustrating example genetic operators used during breeding of score improvement lists.

FIG. 6 is a diagram illustrating genetic operators 600 used during breeding of score improvement lists. Parent score improvement lists 602 and 604 include adjusters ordered differently from each other. The parent score improvement lists can be bred using a crossover, e.g., a one-point crossover, to create children score improvement lists. For example, children score improvement lists 606 and 608 can be created by swapping adjusters after a single point. In this case, the first three elements, e.g., adjusters, in the children score improvement lists 606 and 608 are equivalent to the first three elements in the parent score improvement lists 602 and 604, respectively. The rest of the elements are respectively swapped. In some implementations, breeding can create duplicate adjusters in the same score improvement list. Because an adjuster appears more than once in the child score improvement list 608, e.g., the 6 appears twice, the duplicate adjusters that occur later in the improvement list are not applied again to reorder search results.

In some implementations, the genetic operator includes a mutation. Mutation can occur between any two score improvement lists. In some implementations, mutation occurs on the score improvement list having the lower point value. During breeding, mutation can shuffle one or more adjusters in a score improvement list based on a probability. For example, score improvement lists 610 and 612 can be created by a crossover and mutation genetic operation. In some implementations, score improvement list 612 is mutated. On the other hand, score improvement list 610 is not mutated. The mutation can cause adjusters to be shuffled, e.g., the order of the 5 and the 4 in the mutated score improvement list 612 is shuffled compared to the non-mutated score improvement list 610. In some implementations, genetic operators also include two or more point crossovers or splicing.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media, e.g., multiple CDs, disks, or other storage devices.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data, e.g., one or more scripts stored in a markup language resource, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network, e.g., the Internet, and peer-to-peer networks, e.g., ad hoc peer-to-peer networks.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a client device, e.g., for purposes of displaying data to and receiving user input from a user interacting with the client device. Data generated at the client device, e.g., a result of the user interaction can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:

obtaining search query data, the search query data including a plurality of search queries submitted by users, each search query being associated with one or more responsive search results and user selection data for the one or more search results, wherein the user selection data identifies which search results were selected by users;

obtaining a plurality of score improvement lists, each score improvement list being associated with a point value, each score improvement list being an ordered list of adjusters, wherein the adjusters are serially applied in order of the adjusters in the ordered list to initial scores of a group of search results to determine a final scoring of the search results;

iteratively selecting pairs of score improvement lists from a pool of score improvement lists, the pool of score improvement lists including the plurality of score improvement lists;

automatically for each selected pair:
separately applying the ordered list of adjusters for each score improvement list included in the selected pair to one or more search results associated with a search query from the search query data,
in response to the applying, identifying, for each score improvement list in the selected pair, respective ordered search results responsive to the search query,
determining a winning and losing score improvement list in the selected pair from the search query data for the search query, and
adjusting the point value associated with one or more of the winning score improvement list or the losing score improvement list;

repeating testing for respective pairs of score improvement lists until ending criteria are reached; and selecting one or more score improvement lists based on the respective point values after the repeated testing.

2. The method of claim 1, further comprising:
selecting one or more score improvement lists associated with high point values relative to other score improvement lists;
breeding the one or more score improvement lists associated with high point values with each other using genetic operators to create children score improvement lists; and
adding the children score improvement lists to the pool of score improvement lists during the iterative selecting.

3. The method of claim 1, further comprising:
selecting one or more score improvement lists associated with high point values relative to other score improvement lists;
selecting one or more score improvement lists associated with low point values relative to other score improvement lists; and
breeding each of the one or more score improvement lists associated with a high point value with one or more score improvement lists associated with low point values using a mutation to create children score improvement lists, wherein the mutation has a probability of shuffling an order of one or more adjusters in a score improvement list of the one or more score improvement lists associated with low point values during the iterative selecting.

4. The method of claim 2, wherein selecting a score improvement list associated with a high point value comprises selecting a score improvement list with an associated point value that exceeds a threshold value or selecting a score improvement list with an associated point value that is within a top percentile of the point values associated with the pool of score improvement lists.

5. The method of claim 1, wherein the ending criteria include one or more of the following: the point values associated with the pool of score improvement lists stabilize, a number of iterations of repeated testing of score improvement lists reaches an iteration threshold, or a point value of the point values associated with the pool of score improvement lists reaches a threshold amount more than the other point values associated with the pool of score improvement lists.

6. The method of claim 1, wherein determining a winning and losing score improvement list in the selected pair from the search query data for the search query comprises:
selecting a user preferred search result in the one or more search results associated with the search query based on the user selection data associated with the search query;
determining that the user preferred search result has a higher ranking in the search results responsive to the search query for one of the score improvement lists of the selected pair; and
assigning the score improvement list having the higher ranking user preferred search result as the winning score improvement list.

7. The method of claim 6, wherein selecting the user preferred search result comprises selecting a search result of the one or more search results that has been selected by a majority of users, or selecting a search result of the one or more search results with greatest user time spent on the resource associated with the search result.

8. The method of claim 1, wherein the search query data includes user selection data associated with search results for the search query.

9. The method of claim 1, wherein selecting pairs of score improvement lists from the pool of score improvement lists comprises selecting pairs of score improvement lists randomly or selecting pairs of score improvement lists to test every combination of pairs of score improvement lists in the pool.

10. The method of claim 1, wherein adjusting the point value comprises:
increasing the point value associated with the winning score improvement list; and
decreasing the point value associated with the losing score improvement list.

11. A system comprising:
a processor; and
a non-transitory computer-readable medium coupled to the processor and having instructions stored thereon, which, when executed by the processor, cause the processor to perform operations comprising:
obtaining search query data, the search query data including a plurality of search queries submitted by users, each search query being associated with one or more responsive search results and user selection data for the one or more search results, wherein the user selection data identifies which search results were selected by users;
obtaining a plurality of score improvement lists, each score improvement list being associated with a point value, each score improvement list being an ordered list of adjusters, wherein the adjusters are serially applied in order of the adjusters in the ordered list to initial scores of a group of search results to determine a final scoring of the search results;

iteratively selecting pairs of score improvement lists from a pool of score improvement lists, the pool of score improvement lists including the plurality of score improvement lists;

automatically for each selected pair:
separately applying the ordered list of adjusters for each score improvement list included in the selected pair to one or more search results associated with a search query from the search query data, in response to the applying, identifying, for each score improvement list in the selected pair, respective ordered search results responsive to the search query, determining a winning and losing score improvement list in the selected pair from the search query data for the search query, and adjusting the point value associated with one or more of the winning score improvement list or the losing score improvement list;

repeating testing for respective pairs of score improvement lists until ending criteria are reached; and selecting one or more score improvement lists based on the respective point values after the repeated testing.

12. The system of claim 11, wherein the operations further comprise:
selecting one or more score improvement lists associated with high point values relative to other score improvement lists;

breeding the one or more score improvement lists associated with high point values with each other using genetic operators to create children score improvement lists; and adding the children score improvement lists to the pool of score improvement lists; and adding the children score improvement lists to the pool of score improvement lists during the iterative selecting.

13. The system of claim 11, wherein the operations further comprise:
selecting one or more score improvement lists associated with high point values relative to other score improvement lists;

selecting one or more score improvement lists associated with low point values relative to other score improvement lists; and breeding each of the one or more score improvement lists associated with a high point value with one or more score improvement lists associated with low point values using a mutation to create children score improvement lists, wherein the mutation has a probability of shuffling an order of one or more adjusters in a score improvement list of the one or more score improvement lists associated with low point values during the iterative selecting.

14. The system of claim 12, wherein selecting a score improvement list associated with a high point value comprises selecting a score improvement list with an associated point value that exceeds a threshold value or selecting a score improvement list with an associated point value that is within a top percentile of the point values associated with the pool of score improvement lists.

15. The system of claim 11, wherein the ending criteria include one or more of the following: the point values associated with the pool of score improvement lists stabilize, a number of iterations of repeated testing of score improvement lists reaches an iteration threshold, or a point value of the point values associated with the pool of score improvement lists reaches a threshold amount more than the other point values associated with the pool of score improvement lists.

16. The system of claim 11, wherein determining a winning and losing score improvement list in each selected pair from the search query data for the search query comprises:
selecting a user preferred search result in the one or more search results associated with the search query based on the user selection data associated with the search query; and determining that the user preferred search result has a higher ranking in the search results responsive to the search query for one of the score improvement lists of the selected pair; and assigning the score improvement list having the higher ranking user preferred search result as the winning score improvement list.

17. The system of claim 16, wherein selecting the user preferred search result comprises selecting a search result of the one or more search results that has been selected by a majority of users, or selecting a search result of the one or more search results with greatest user time spent on the resource associated with the search result.

18. The system of claim 11, wherein the search query data includes user selection data associated with search results for the search query.

19. The system of claim 11, wherein adjusting the point value comprises:
increasing the point value associated with the winning score improvement list; and decreasing the point value associated with the losing score improvement list.

20. A non-transitory computer-readable medium having instructions stored thereon, which, when executed by a processor, cause the processor to perform operations comprising:
obtaining search query data, the search query data including a plurality of search queries submitted by users, each search query being associated with one or more responsive search results and user selection data for the one or more search results, wherein the user selection data identifies which search results were selected by users;

obtaining a plurality of score improvement lists, each score improvement list being associated with a point value, each score improvement list being an ordered list of adjusters, wherein the adjusters are serially applied in order of the adjusters in the ordered list to initial scores of a group of search results to determine a final scoring of the search results;

iteratively selecting pairs of score improvement lists from a pool of score improvement lists, the pool of score improvement lists including the plurality of score improvement lists;

automatically for each selected pair:
separately applying the ordered list of adjusters for each score improvement list included in the selected pair to one or more search results associated with a search query from the search query data, in response to the applying, identifying, for each score improvement list in the selected pair, respective ordered search results responsive to the search query, determining a winning and losing score improvement list in the selected pair from the search query data for the search query, and adjusting the point value associated with one or more of the winning score improvement list or the losing score improvement list;
repeating testing for respective pairs of score improvement lists until ending criteria are reached; and
selecting one or more score improvement lists based on the respective point values after the repeated testing.

* * * * *